J. KRULL.
POULTRY WATERER.
APPLICATION FILED FEB. 23, 1921.
1,384,699.
Patented July 12, 1921.
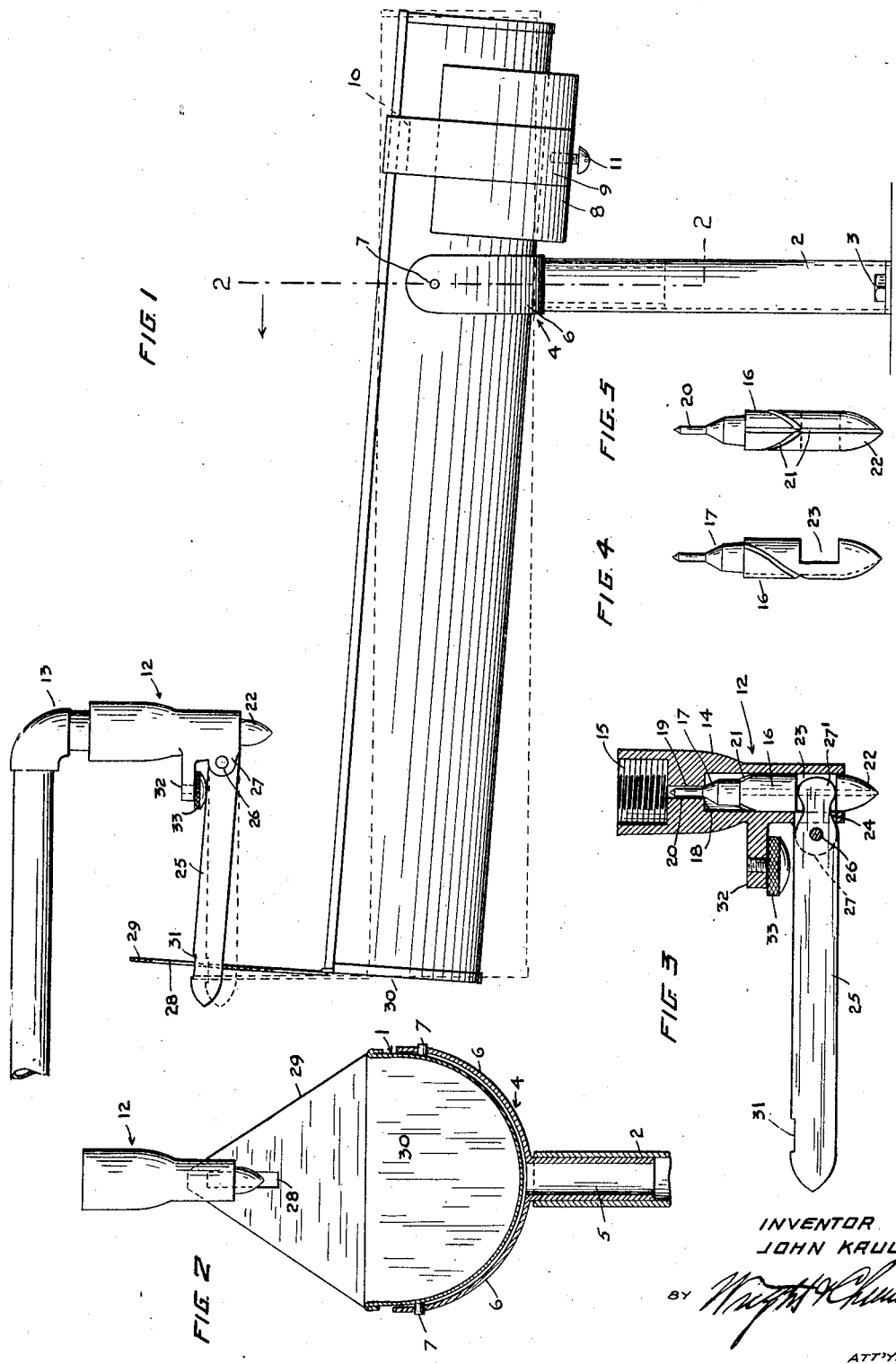
INVENTOR
JOHN KRULL
BY
ATT'YS.

UNITED STATES PATENT OFFICE.

JOHN KRULL, OF HAYWARD, CALIFORNIA.

POULTRY-WATERER.

1,384,699.  Specification of Letters Patent.  Patented July 12, 1921.

Application filed February 23, 1921. Serial No. 447,262.

*To all whom it may concern:*

Be it known that I, JOHN KRULL, a citizen of the United States, residing at Hayward, in the county of Alameda and State of California, have invented new and useful Improvements in Poultry-Waterers, of which the following is a specification.

This invention relates to a device for providing water for poultry, rabbits and other small animals and the primary object of the invention is to provide a device of this character in which the water in the trough is maintained at a uniform or approximately uniform level, the water feed to the trough being automatically regulated whereby waste of the water and a consequent sloppy condition about the trough are prevented.

One of the objects of the invention is to provide a device of the character described in which there is provided a counterbalanced trough pivotally mounted upon a swivel and so operatively associated with an automatic valve that the weight of water in the trough acts as a balance to maintain the valve closed whereby when the quantity of water in the trough is below that which is desired the valve will be opened, and when the water quantity reaches the predetermined point the valve will close.

Another object of the invention is to so arrange and associate the elements of a watering device of the character described, that a more convenient access thereto by poultry and the like is had and further so that all possibility of the device being deranged and failing to operate properly by reason of being jarred or knocked against by the poultry is eliminated.

Another object is to provide a device of the character described in which the automatic water supply means may be regulated so that the quantity or height of the level of water to be maintained in the trough may be provided as desired.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings Figure 1 is a side elevation of the device of my invention showing it in full lines in the position assumed when the trough does not contain the proper quantity of water and in dotted lines in the position assumed by the device when the trough is properly filled.

Fig. 2 is a fragmentary vertical sectional view taken on the line 2—2 of Fig. 1.

Fig. 3 is a vertical sectional view of the automatic feed valve showing the operating lever in side elevation.

Fig. 4 is a detail side elevation of the valve.

Fig. 5 is a similar view of the valve taken from a different angle.

Referring to the preferred embodiment of the invention as shown in the drawing there is provided an elongated trough 1 which is preferably of semi-circular outline in cross section and comparatively shallow, although it may be otherwise constructed, dependent upon conditions attending its use. Adjacent to one end of the trough but spaced from said end approximately one fourth of the length of said trough is an upright support or standard 2 which may be bolted or otherwise secured, as at 3 to the ground or suitable supporting surface therefor.

A bracket 4 is swiveled into the upper end of the standard 2 and said bracket comprises a stem 5 and outwardly and upwardly curving arms 6 attached to the stem. The arms embrace the sides of the trough at the aforementioned point and are pivoted as at 7 to opposite sides thereof. A counter balancing weight member 8 of arcuate form is adjustably mounted upon the under side of the trough and engages therewith as shown in Figs. 1 and 2. A metal strap 9 supports the weight for longitudinal adjustment upon the under side of the trough, the ends of the strap being turned downward as at 10 so as to overlie the inner sides of the trough at the upper edges thereof. A set screw 11 is inserted through the strap and is adapted to engage the bottom of the trough so as to hold the weight in adjusted position. By having the counter weight disposed between one end of the trough and the pivot 7 the other end of the trough will be elevated as shown in full lines in Fig. 1, when the trough does not contain the predetermined quantity of water.

Disposed over the trough adjacent to the elevated end thereof is an automatic feed valve generally designated 12. This valve is supported by and depends from a water feed pipe 13. The pipe 13 may be supported in any suitable manner above the valve and leads to a water supply not shown. The valve 12 comprises a casing 14 having an enlarged screw threaded bore 15 at its upper end, for the reception of the pipe 13 and is opened at its lower end. Mounted for vertical movement within the casing 14 is a needle valve 16 having a conical portion 17 adjacent to its upper end, which portion coöperates with a seat 18 formed at the lower end of a reduced portion 19 of the bore of the casing. Extending upwardly from the conical portion 17 is a pin like projection 20 which extends through the portion 19 and into the enlarged bore 15 and acts as a guide and also for preventing a too rapid flow of water through the casing. The body of the valve 16 is enlarged with reference to the conical portion 17 and is provided with a series of spirally and longitudinally extending grooves 21. The longitudinally extending grooves terminate at the lower pointed end 22 of the valve which end is disposed below the lower end of the casing directly over the trough 1. In one side of a mediate portion of the body of the valve there is provided a recess or notch 23 which is adapted to register with a recess or opening 24 formed through the casing 14. A valve operated lever 25 is pivoted adjacent to one end as at 26 between ears 27 extending outwardly from opposite sides of the recess or opening 24.

The inner end of this lever is provided with rounded edges 27' and engages in the notch or recess 23 in the valve. The other end of the lever 25 is disposed at the adjacent end of the trough and engages in a vertical slot or opening 28 formed in an upward projection 29 of the end wall 30 of the trough. The projection 29 preferably tapers to a point toward its upper end. To prevent accidental withdrawal of the lever from the opening 28 said lever is notched on its upper side as at 31 where it engages in said opening.

When the trough is empty or does not contain the proper quantity of water, the trough and valve will be in the position shown in full lines in Fig. 1, the weight 8 serving to hold the trough in the inclined position shown. In this position the valve lever 25 rests upon the lower edge of the opening 28 and is held in such position that the valve 16 is held in seated or open position. This allows water from the pipe 13 to run through the reduced portion 19 of the bore, the grooves 21, and trickle slowly from the lower pointed end 22 of the valve, into the trough. Extending outwardly from one side of the casing 14 is a lug 32 provided with an adjusting member 33 which member is adapted to engage the upper side of the lever 25 so as to limit the upward movement of the lever. The member 33 is capable of being raised or lowered whereby the extent of movement of the valve lever and valve may be regulated as desired to effect the degree of opening of the valve and regulate the rate of flow of the water. Preferably the water is allowed to run slowly so as to trickle into the trough. When the trough becomes sufficiently filled, the weight of the water therein causes the upwardly inclined end of the trough to lower and when said trough reaches the predetermined position say for example, that shown in dotted lines in Fig. 1, the extension 29 is moved downwardly and communicates a downward pull upon the outer end of the lever 25. This moves the inner end of the lever upwardly and forces the valve 16 upwardly into closed position. As long as the weight of water in the trough is sufficient to hold the valve closed against the action of said weight 8 the supply of water to the trough will be cut off. As soon as the predetermined level of the water and weight of the water in the trough is lowered below that point required to maintain the valve closed, the valve will open slightly by reason of the subsequent inclining of the trough and upward movement of the extension 29, and water will again run into the trough until the weight of the water is sufficient to effect the closing of the valve. It will thus be seen that the amount of water or level thereof is regulated so that an approximately constant quantity or level of water is maintained in the trough at all times. The height of the level of the water in the trough and the quantity of water may be regulated by adjustment of the weight 8 and the member 33. By having the valve 12 inwardly offset with relation to one end of the trough and disposed over said trough practically the entire trough is accessible to poultry, rabbits and other small animals and possibility of the poultry and animals bumping against and deranging the parts is obviated. By provision of swivel bracket 4 upon which the trough is pivoted, sufficient freedom of movement is given the trough incident to bumps and jars occasioned in the use of the device to eliminate possibility of the lever 25 becoming caught in the opening 28 and to prevent any other derangement of the apparatus. This is one of the essential features of my invention. It is necessary to clean out the trough frequently and by reason of the swivel bracket 4 the trough and bracket may be easily and readily lifted from the standard 2. The opening 28 permits of the withdrawal of the extension 29 from contact with the lever 25 and it will thus be seen that it is not necessary to disassemble the apparatus to any extent in order to lift the trough out of place. When the trough is removed the member 33 is moved downwardly sufficient to engage the lever 25 and hold it in such position that the valve will be closed. For reassembling the waterer the member 33 is moved back into its normal position. This arrangement serves to prevent waste of water during the assembling and disassembling of the apparatus. By reason of the rounded end 27 of the lever 25 working in a notch or recess 23 in the side of the valve, all possibility of the sticking or jamming of the lever and failing of the valve to operate properly is eliminated

I claim:—

1. A poultry waterer embodying in its construction a standard, a bracket swiveled in said standard, a trough pivotally mounted on said bracket, a weight member adjustably supported upon the trough adjacent to one end thereof, a water supply pipe, a valve disposed adjacent the other end of the trough and connected with said water supply pipe and means of connection between said trough and valve operating to open said valve when the weight of the water in the trough is below a predetermined point and to close said valve when the weight of the water in the trough reaches said predetermined point.

2. A poultry waterer comprising a standard, a bracket swiveled to the standard, a trough pivoted to said bracket, a weight member longitudinally adjustably mounted upon the trough adjacent to one end thereof and an automatic water supply valve operatively associated with the trough adjacent its other end and arranged to open when the weight of the water in the trough is below a predetermined point and to close when said weight of the water reaches said predetermined point.

3. A poultry waterer comprising a trough, means for pivotally supporting the trough adjacent but spaced from one end thereof, a weight member adjustably supported upon said trough between said end and said pivot means, an upstanding member at the other end of the trough, a lever loosely connected with said upstanding member and extending inwardly over the trough, a valve casing having a valve seat therein and disposed adjacent the inner end of the said lever, a water supply pipe connected with said valve casing, and a valve movable into and out of engagement with its seat and with which said lever is connected at its inner end and means on said casing with which said lever engages and which is adjustable to regulate the movement of the lever.

4. A poultry waterer comprising a trough, means for pivotally supporting the trough adjacent but spaced from one end thereof, a weight member adjustably supported upon said trough between said end and said pivot means, an upstanding member at the other end of the trough, a lever loosely connected with said upstanding member and extending inwardly over the trough, a valve casing having a valve seat therein and disposed adjacent the inner end of the said lever, a water supply pipe connected with said valve casing and a valve movable into and out of engagement with its seat and with which said lever is connected at its inner end and supporting means to which said trough is swiveled.

5. A poultry waterer comprising a trough, an upright standard, a bracket swiveled on said standard, pivots connecting said bracket and trough adjacent but spaced from one end of said trough, a weight member longitudinally adjustably mounted on the under side of the trough between said pivot and the adjacent end of the trough, an upward extension at the other end of the trough, having an elongated opening therein, a lever having one end extending through said opening and its other end disposed over the trough, a water supply pipe and a valve connected with said water supply pipe, disposed over said trough and with which said lever is connected.

6. In a device of the character described, a valve casing adapted for connection with a water supply line at one end and having its other end open, said casing having a valve seat therein, a valve longitudinally movably mounted within said casing and provided with a portion adjacent to one end for engagement with said seat, said valve being enlarged with relation to said seat engaging portion and having a longitudinally extending groove in said enlarged portion, said groove terminating at the lower end of the valve, said valve having its lower end disposed below said casing and a valve operating lever pivoted to the casing intermediate its ends and having one end extended through said casing, said valve having a notch therein receiving said end of the lever and a member carried on said valve casing and movable toward and away from said lever to regulate the movement thereof.

JOHN KRULL.